US008588079B2

(12) United States Patent
Deleam et al.

(10) Patent No.: US 8,588,079 B2
(45) Date of Patent: Nov. 19, 2013

(54) METHOD OF NOTIFYING A TRANSMISSION DEFECT OF AN AUDIO SIGNAL

(75) Inventors: David Deleam, Perros Guirec (FR); Laurent Clarimon, Lannion (FR)

(73) Assignee: France Telecom, Paris (FR)

( * ) Notice: Subject to any disclaimer, the term of this patent is extended or adjusted under 35 U.S.C. 154(b) by 394 days.

(21) Appl. No.: 12/297,470

(22) PCT Filed: Apr. 12, 2007

(86) PCT No.: PCT/FR2007/051103

§ 371 (c)(1),
(2), (4) Date: Oct. 17, 2008

(87) PCT Pub. No.: WO2007/122339

PCT Pub. Date: Nov. 1, 2007

(65) Prior Publication Data

US 2009/0129279 A1 May 21, 2009

(30) Foreign Application Priority Data

Apr. 18, 2006 (FR) ..................................... 06 03429

(51) Int. Cl.
*G06F 11/00* (2006.01)

(52) U.S. Cl.
USPC .............. 370/241; 370/216; 714/48; 714/746

(58) Field of Classification Search
None
See application file for complete search history.

(56) References Cited

U.S. PATENT DOCUMENTS

| | | | | |
|---|---|---|---|---|
| 2002/0191594 | A1* | 12/2002 | Itoh et al. | 370/352 |
| 2003/0231589 | A1* | 12/2003 | Itoh et al. | 370/230 |
| 2005/0166124 | A1* | 7/2005 | Tsuchinaga et al. | 714/776 |
| 2008/0151769 | A1* | 6/2008 | El-Hennawey et al. | 370/252 |
| 2012/0127988 | A1* | 5/2012 | Vargo et al. | 370/352 |
| 2012/0188832 | A1* | 7/2012 | Vogt | 365/191 |

OTHER PUBLICATIONS

Y. Stein et al., "Data Communications: TDM over IP", IETF Standard-Working-Draft, Internet Engineering Task Force, vol. pwe 3, No. 1, May 31, 2004, XP015026064.*

* cited by examiner

*Primary Examiner* — Chi Pham
*Assistant Examiner* — Mohammad Adhami
(74) *Attorney, Agent, or Firm* — Cozen O'Connor

(57) ABSTRACT

A method of notifying on a downstream link (2) of a network element (20) a transmission defect affecting an audio signal coded on an upstream link (1) of said network element. The method comprises a step in which the network element (20) sends, on said downstream link, an audio coded notification signal containing a specific notification pattern. Application to the switchover from an asynchronous link to a synchronous link.

19 Claims, 1 Drawing Sheet

METHOD OF NOTIFYING A TRANSMISSION DEFECT OF AN AUDIO SIGNAL

RELATED APPLICATIONS

This is a U.S. national stage under 35 USC 371 of application No. PCT/FR2007/051103, filed on Apr. 12, 2007.

This application claims the priority of French patent application no. 06/03429 filed Apr. 18, 2006, the content of which is hereby incorporated by reference.

FIELD OF THE INVENTION

The present invention relates to a method of notifying on a downstream link of a network element a transmission defect affecting an audio signal coded on an upstream link of said network element.

The invention finds a particularly advantageous application when coded audio data is switched over, via a communication gateway, from a first type of transport on an upstream link to a second type of transport on a downstream link.

The full benefit of the invention is apparent when one of the two links operating via data frames does not allow, on account of its nature, easy notification of information regarding a transmission defect, such as the loss of frames for example. This situation is typically encountered in the case of a synchronous downstream link of DECT ("Digital Enhanced Cordless Telecommunications") type having to insert, every 10 ms, an 80-byte frame corresponding to a fixed throughput of 32 kbits/s.

BACKGROUND OF THE INVENTION

In a VoIP (Voice over IP) application, the upstream link may be an asynchronous Ethernet IP link under the RTP protocol ("Real Time Protocol").

A transmission defect on the upstream link may consist of a loss of IP packets on this link or an absence, at the level of the network element, of frames to be transmitted on the downstream link, said network element possibly being a domestic communication gateway for example.

Two methods for processing this transmission defect are known:

- the gateway is equipped with an audio coder and decoder as well as with an error correcting mechanism. The gateway decodes the audio packets received and, if it detects a loss of packets, it activates its error correcting mechanism by generating one or more frames which will be coded then sent on the synchronous downstream link, for example, in replacement for the missing frames. The audio terminal at the end of the synchronous link decodes all the frames received, including the replacement frames, and provides the corresponding audio signal.
- when a loss of packets on the upstream link is detected, the network element acting as gateway repeats the last frame that it previously dispatched on the synchronous downstream link for example, doing so as many times as necessary to replace all the frames missing on the latter link.

However, these known methods making it possible to take account of the transmission defects upstream of the network element exhibit a certain number of drawbacks.

The first method requires the presence of a decoder, of an error correcting mechanism and of a coder at the level of the domestic gateway, in addition to the decoder already present in the audio terminal at the end of the synchronous downstream link. This substantially complicates the architecture of the gateway.

The second method leads to sub-optimal restitution quality on account of the introduction of repetitions of syllables when there are losses on the first upstream link. For example, if the last frame dispatched before the loss of packets is the last syllable "-bile" of the word "automobile", the gateway may be induced to re-send this syllable several times to fill in the lost frames, thereby resulting after decoding by the terminal in the sound sequence "automobile-bile- . . . ", which is particularly unpleasant to listen to.

SUMMARY OF THE INVENTION

One object of the present invention is to provide a method of notifying on a downstream link of a network element of a transmission defect affecting an audio signal coded on an upstream link of said network element, which would make it possible to guarantee good quality listening, even in the event of upstream transmission defects, while avoiding recourse to a complex network element architecture or to additional protocols.

This and other objects are attained in accordance with one aspect of the present invention, directed to a method that comprises a step in which the network element sends, on said downstream link, an audio coded notification signal containing a specific notification pattern.

Thus, when it detects a transmission defect on the upstream link, the network element, such as a domestic gateway, sends downstream an audio coded signal in the same format as the normally coded audio signals sent, but containing a particular item of information, namely notification of the detection of a defect, in the form of a specific pattern. The gateway does not therefore require any additional unwieldy item of equipment such as a decoder, a coder or an error correcting mechanism.

The notification of the transmission defect, via the specific pattern, is received by the recipient audio terminal, which can then process this information according to two different modes.

In a first processing mode, an embodiment of the invention provides that said audio terminal comprises a module for detecting at least one specific notification pattern transmitted in an audio coded notification signal sent by a network element subsequent to the detection by said network element of a transmission defect affecting an audio signal coded on an upstream link of said network element.

Having detected in this way the presence of a defect in the audio signal transmitted, the terminal can then take the appropriate measures to process this defect. In particular, if said terminal comprises a module for correcting at least one transmission defect, an error correcting mechanism can be triggered taking into account the signals received in the past. Such mechanisms are known to the person skilled in the art and do not enter into the field of the present invention.

In a second processing mode, the audio coded signal containing the specific notification pattern is simply decoded by the terminal like the other coded signals received. However, an embodiment of the invention provides that said specific pattern is neutral to the audio decoding.

In particular, said specific pattern exhibits a substantially zero probability of occurrence with respect to the normal audio coded samples, notably the speech samples. The benefit of choosing a very improbable pattern is to limit to the maximum the pattern detection errors since an arbitrary coded audio signal will cause the pattern to appear naturally only very exceptionally.

Likewise, it is envisaged that said specific pattern exhibits a substantially zero energy after decoding, namely very low energy, hence almost inaudible to the human ear.

It is understood that the latter characteristics relating to the neutrality to the decoding of the notification pattern are particularly advantageous since they allow two possible implementations of the invention. In an optimal implementation, the specific notification pattern triggers an error correcting mechanism if the audio terminal is equipped with one. In a sub-optimal implementation, without detection module or error correction, the specific pattern does not introduce large defects into the decoded signal, this amounting in fact to performing an error correction by inserting silences.

Stated otherwise, the method in accordance with the invention is compatible with all audio terminals whether or not they are equipped with a module for detecting notification patterns and/or a module for correcting errors.

The transmission defect on the upstream link of the network element may originate in many ways.

According to a first example, said transmission defect is a lack of at least one signal frame to be transmitted on a synchronous downstream link. In this case, the network element may not transmit one or more consecutive frames on the synchronous link, and, to compensate for this defect which is incompatible with the synchronous operation of the link, it sends a notification signal in which said notification signal is a frame containing said specific pattern, sent by the network element on the synchronous downstream link in replacement for said missing frame to be transmitted on said synchronous downstream link.

Two situations are possible, either said lack of frame results from a loss of at least one signal packet on an asynchronous upstream link, or said lack of frame results from an absence of frame to be transmitted in a register of said network element. The latter situation arises for example in the event of jitter on the asynchronous upstream link which results in a "void" in the register of the FIFO type of the network element.

According to a second example, said transmission defect is an impairment of the signal on the upstream link. In the case of a synchronous downstream link, no frame to be transmitted is lacking but one or more frames are erroneous. An embodiment of the invention provides that said notification signal is a signal containing said specific pattern, sent by the network element on the downstream link in replacement for said signal impaired on the upstream link.

Another aspect of the invention also relates to a device for notifying an audio terminal on a downstream link of a network element of a transmission defect affecting an audio signal coded on an upstream link of said network element, noteworthy in that said network element comprises means for detecting at least one upstream transmission defect and means able to transmit to the audio terminal on said downstream link an audio coded notification signal containing a specific notification pattern.

Another aspect of the invention relates to a device for notifying a second network element on a downstream link of a first network element of a transmission defect affecting an audio signal coded on an upstream link of said first network element, noteworthy in that the first network element comprises means for detecting at least one upstream transmission defect and means able to transmit to the second network element on said downstream link an audio coded notification signal containing a specific notification pattern.

Another aspect of the invention relates to a network element, noteworthy in that it comprises means for detecting at least one transmission defect affecting an audio signal coded on an upstream link of said network element and means able to send on a downstream link an audio coded notification signal containing a specific notification pattern.

Another aspect of the invention relates to a computer program, intended to be installed in a network element according to the invention, comprising code instructions for executing the method according to the invention when said program is executed by a computer.

Another aspect of the invention relates to a computer program, intended to be installed in an audio terminal according to the invention, comprising code instructions for executing the method according to the invention when said program is executed by a computer.

DETAILED DESCRIPTION OF THE DRAWINGS

Figure 1:
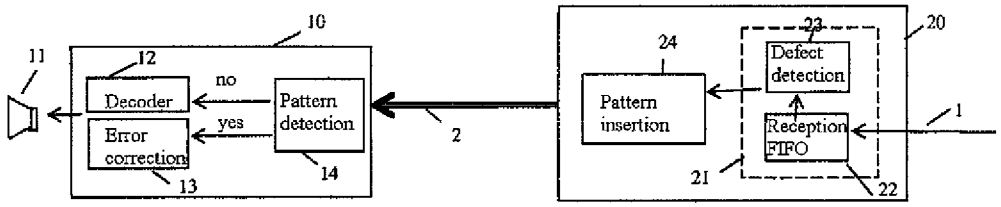
FIG. 1 is a diagram of a transmission defect notification device according to a first embodiment of the invention.

Represented in FIG. 1 is a device intended to notify an audio terminal 10 at the end of a link 2 downstream of a network element 20 a transmission defect affecting an audio signal coded on a link 1 upstream of the gateway 20.

In this exemplary embodiment, the upstream link 1 is an asynchronous IP link, the network element 20 is a VoIP domestic gateway and the downstream link 2 is a synchronous link of DECT or other type such as a Bluetooth link.

The transmission defect envisaged here is a lack of at least one frame is to be transmitted by the gateway 20 on the synchronous link 2.

This lack of frame may result from the loss of packets on the IP asynchronous link 1. A packet being able to contain several frames, the loss of an upstream packet may therefore give rise to the loss of several frames to be transmitted downstream. In this case, the Voice over IP management protocol stack 21 of the gateway 20 comprises a packet loss detector 23 able to detect a break in the continuity of the sequence numbers Ns received in the consecutive RTP packets.

The lack of frame can also result from jitter on the upstream network and/or from the asynchronism of the terminals, the consequence being the creation of a "void" in the FIFO reception register 22 of the stack 21. This "void" corresponds to an absence of frame to be transmitted on the synchronous link 2.

If one or other of these defects is detected, namely loss of packet(s) or absence of frame(s) to be transmitted, at least one specific notification pattern is inserted by an insertion module 24 of the gateway 20 into one or more audio coded frames in place of the missing frame or frames. This or these replacement frames are thereafter sent on the synchronous link 2 to the audio terminal 10.

In the case where the frames on the synchronous link 2 are 10-ms frames for example, it is understood that a loss of a 40-ms IP packet will result in the sending by the gateway 20 of four 10-ms replacement frames containing the specific pattern. A jitter of 10 ms on an IP packet will cause a "void" of a frame which will be compensated by the sending of a single replacement frame containing the specific pattern.

The terminal 10 may be a DECT, Bluetooth or other terminal. It comprises an earphone or loudspeaker 11, an audio speech or sound decoder 12 as well as a module 14 for detecting specific notification patterns. If a notification pattern is detected by the module 14, an error correction module 13 is implemented by the terminal 10.

If the terminal 10 has neither a module 14 for detecting patterns, nor an error correction module 13, the audio coded frame containing the specific pattern is decoded as a standard frame by the decoder 12. This is why it is recommended by the invention that this specific pattern be neutral to the decoding because it is chosen in such a way as to have little chance of occurrence and/or low energy.

The specific notification pattern must be adapted to the type of audio coder used and can be determined empirically. In the case of the G.722 coder, the applicant has established that the binary pattern 0xFF repeated over the length of a frame was suitable. For example, 80 bytes 0xFF to fill a frame of 640 bits and 10 ms on a DECT synchronous link.

Figure 2:
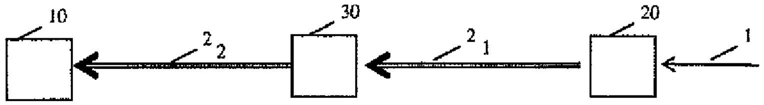
FIG. 2 is a diagram of a transmission defect notification device according to a second embodiment of the invention.

FIG. 2 illustrates a second embodiment of the invention in which a synchronous link 2 is composed of two sub-links of different nature, namely, for example, a first USB sub-link $\mathbf{2}_1$ between the gateway 20 and a network element 30, followed by a second DECT sub-link $\mathbf{2}_2$ up to the terminal 10.

The transmission defects arising on the synchronous link 1 are taken into account by the gateway 20 in the manner which has just been described in detail with reference to FIG. 1.

However, the network element 30 can, furthermore, handle the transmission defects on the first USB sub-link $\mathbf{2}_1$, whether this be a loss of frame or an impairment of an existing frame, through loss of bits for example.

In this case, the network element 30 comprises, like the gateway 20, a means for detecting defects and a means for inserting a specific notification pattern identical to the pattern implemented by the gateway 20. This pattern is included by the network element 30 in a frame replacing a missing frame or substituting for an impaired existing frame.

On receipt and detection of a frame which includes the specific pattern, the terminal 10 activates its error correcting mechanism without distinction as to the origin of the defect thus notified, the latter possibly originating from the asynchronous link 1 or the synchronous sub-link $\mathbf{2}_1$.

Figure 3:
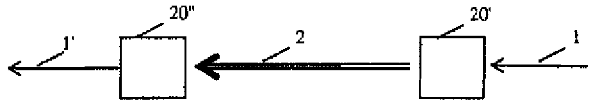
FIG. 3 is a diagram of a transmission defect notification device according to a third embodiment of the invention.

FIG. 3 shows a third embodiment of the invention implementing a first network element 20' serving as gateway between an asynchronous upstream link 1 and a synchronous downstream link 2 terminating in a second network element 20" itself serving as gateway between the synchronous link 2 and an asynchronous downstream link 1'. It will be assumed that the coders used on each link are identical.

By way of example, the diagram of links of FIG. 3 could be disposed upstream of the diagrams of FIGS. 1 and 2.

If the gateway 20' detects a loss of packets on the asynchronous link 1, a specific notification pattern is inserted into a replacement frame sent by said gateway 20' on the synchronous link 2.

In the case where the gateway 20" is not equipped with a module for detecting patterns, said replacement frame is transmitted as is on the asynchronous downstream link 1' until it possibly finishes up at a terminal 10 which will process the notification pattern in the manner set forth above.

In the case where the gateway 20' comprises a module for detecting patterns, the defect detected by the gateway 20' is transferred downstream by the gateway 20". If, for example, the defect detected by the gateway 20' is the loss on the link 1 of the packet bearing the sequence number Ns=8, the gateway 20' sends a specific notification pattern in one or more frames on the link 2 corresponding to the lost frames with packet "8". The gateway 20" then detects the frames bearing said specific pattern but without reconstructing a replacement packet "8", the packet "8" still being missing on the asynchronous link 1'. This defect will be handled downstream by a gateway analogous to the gateway 20 of FIGS. 1 and 2.

The invention claimed is:

1. A method of notifying a terminal on a downstream link of a network element of a transmission defect affecting an audio signal coded on an upstream link of said network element, wherein the method comprises a step in which the network element sends, on said downstream link, an audio coded notification signal comprising at least one predetermined notification pattern inserted in place of a defect frame, said predetermined notification pattern destined to inform the terminal of the transmission defect, and said at least one predetermined notification pattern being configured to trigger an error correcting mechanism of the terminal to perform a correction of the transmission defect at the terminal.

2. The method as claimed in claim 1, wherein said at least one predetermined notification pattern is neutral to audio decoding.

3. The method as claimed in claim 2, wherein said at least one predetermined notification pattern exhibits a substantially zero probability of occurrence with respect to frames of the audio signal coded on the upstream link.

4. The method as claimed in claim 2, wherein said at least one predetermined notification pattern exhibits a substantially zero energy with respect to frames of the audio signal after decoding.

5. The method as claimed in claim 1, wherein said transmission defect is a lack of at least one signal frame to be transmitted on a synchronous downstream link.

6. The method as claimed in claim 5, wherein said lack of frame results from a loss of at least one signal packet on an asynchronous upstream link.

7. The method as claimed in claim 5, wherein said lack of frame results from an absence of frame to be transmitted in a register of said network element.

8. The method as claimed in claim 5, wherein said notification signal is a frame containing said at least one predetermined notification pattern, sent by the network element on the synchronous downstream link, in replacement for the lack of said at least one signal frame to be transmitted on said synchronous downstream link.

9. The method as claimed in claim 1, wherein said transmission defect is an impairment of the audio signal on the upstream link.

10. The method as claimed in claim 9, wherein said notification signal is a signal containing said at least one predetermined notification pattern, sent by the network element on the downstream link, in replacement for said audio signal impaired on the upstream link.

11. A device for notifying an audio terminal on a downstream link of a network element, of a transmission defect affecting an audio signal coded on an upstream link of said network element, wherein the device comprises means for detecting at least one upstream transmission defect, and means able to transmit to the audio terminal on said downstream link, an audio coded notification signal comprising at least one predetermined notification pattern inserted in place of a defect frame, said predetermined notification pattern destined to inform the audio terminal of the transmission defect, and said at least one predetermined notification pattern being configured to trigger an error correcting mechanism of the terminal to perform a correction of the transmission defect at the terminal.

12. A network element, comprising means for detecting at least one transmission defect affecting an audio signal coded on an upstream link of said network element, and means able to send on a downstream link, an audio coded notification signal comprising at least one predetermined notification pattern for said defect inserted in place of a defect frame, said predetermined notification pattern destined to inform a terminal of the transmission defect, and said at least one predetermined notification pattern being configured to trigger an error correcting mechanism of the terminal to perform a correction of the transmission defect at the terminal.

13. A non-transitory computer readable medium storing a computer program comprising instructions which when executed in a network element, upon detection by the network element of at least one transmission defect affecting an audio signal coded on an upstream link of said network element, causes said network element to send on a downstream link, an audio coded notification signal comprising at least one predetermined notification pattern for said defect inserted in place of a defect frame, said predetermined notification pattern destined to inform a terminal of the transmission defect, and said at least one predetermined notification pattern being configured to trigger an error correcting mechanism of the terminal to perform a correction of the transmission defect at the terminal.

14. An audio terminal, comprising a module for detecting at least one predetermined notification pattern inserted in place of a defect frame, transmitted in an audio coded notification signal sent by a network element, subsequent to the detection by said network element of a transmission defect affecting an audio signal coded on an upstream link of said network element, wherein said predetermined notification pattern informs the audio terminal of the transmission defect, and said at least one predetermined notification pattern being configured to trigger an error correcting mechanism of the terminal to perform a correction of the transmission defect at the terminal.

15. The terminal as claimed in claim 14, wherein said terminal comprises a module for correcting at least one transmission defect.

16. A non-transitory computer readable medium storing a computer program comprising code instructions which when executed in an audio terminal causes a module to detect at least one predetermined notification pattern inserted in place of a defect frame, transmitted in an audio coded notification signal sent by a network element, subsequent to the detection by said network element of a transmission defect affecting an audio signal coded on an upstream link of said network element, wherein said predetermined notification pattern informs the audio terminal of the transmission defect, and said at least one predetermined notification pattern being configured to trigger an error correcting mechanism of the terminal to perform a correction of the transmission defect at the terminal.

17. A method of receiving by a terminal on a downstream link of a network element a transmission defect affecting an audio signal coded on an upstream link of said network element, the method comprising:

receiving, by the terminal on said downstream link, an audio coded notification signal comprising at least one predetermined notification pattern inserted in place of a defect frame;

detecting said at least one predetermined notification pattern; and correcting at least one transmission defect affecting said audio signal, wherein said predetermined notification pattern informs the terminal of the at least one transmission defect, and the at least one predetermined notification pattern triggers the terminal to perform the correcting of the at least one transmission defect at the terminal.

18. The method as claimed in claim 1, further comprising:

receiving, by the terminal on said downstream link, the audio coded notification signal comprising the at least one predetermined notification pattern inserted in place of the defect frame;

detecting said at least one predetermined notification pattern; and correcting at least one transmission defect affecting said audio signal.

19. The method as claimed in claim 1, wherein frames of the coded audio signal including said at least one predetermined notification pattern are configured to be decoded in the same manner as frames of the coded audio signal which do not include said at least one predetermined notification pattern.

* * * * *